Dec. 16, 1952 S. P. KISH 2,621,367
METHOD OF MAKING TEMPLATES
Original Filed Jan. 24, 1950 2 SHEETS—SHEET 1
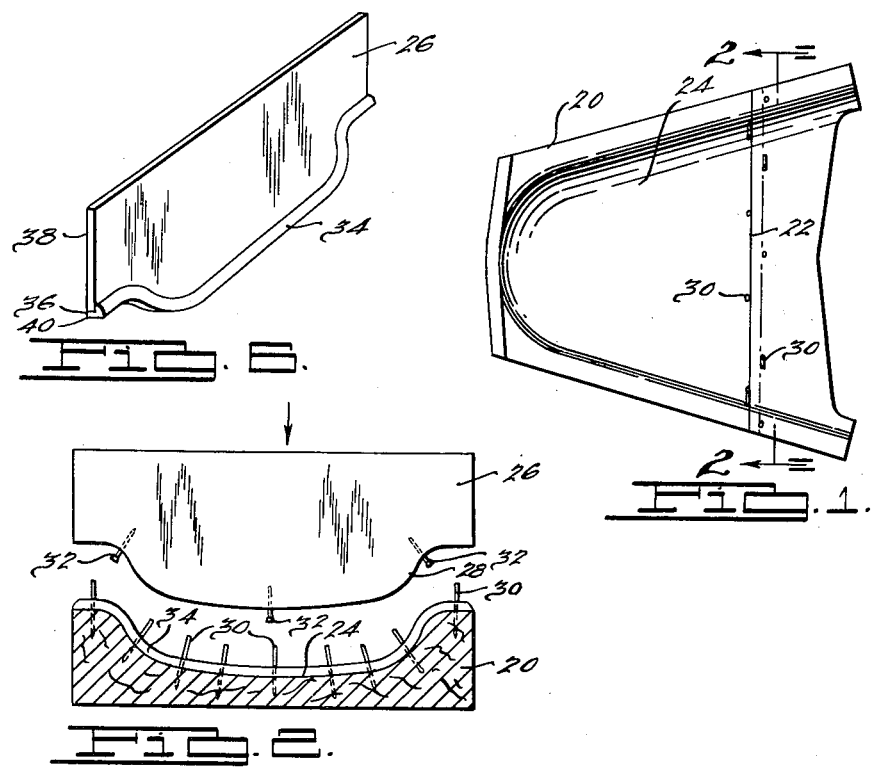
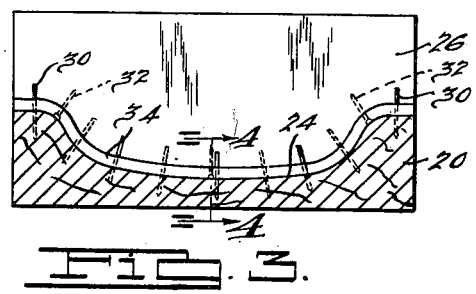
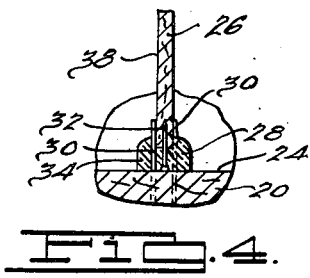 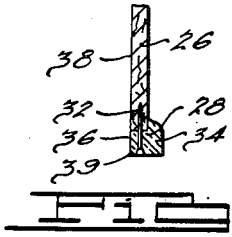
INVENTOR.
Steven P. Kish.
BY
Harness, Dickey & Pierce
ATTORNEYS.

Dec. 16, 1952     S. P. KISH     2,621,367
METHOD OF MAKING TEMPLATES
Original Filed Jan. 24, 1950     2 SHEETS—SHEET 2
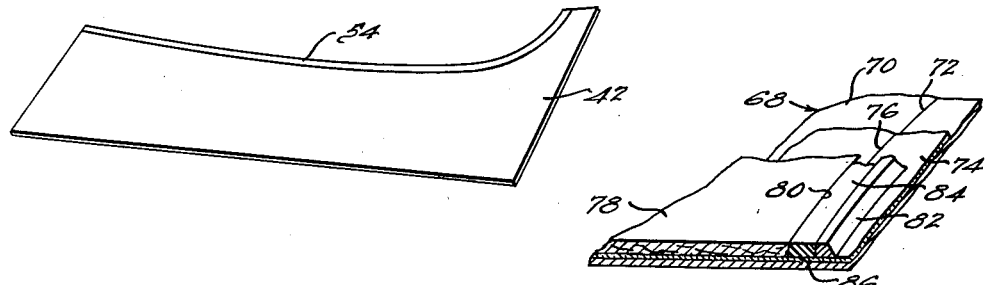
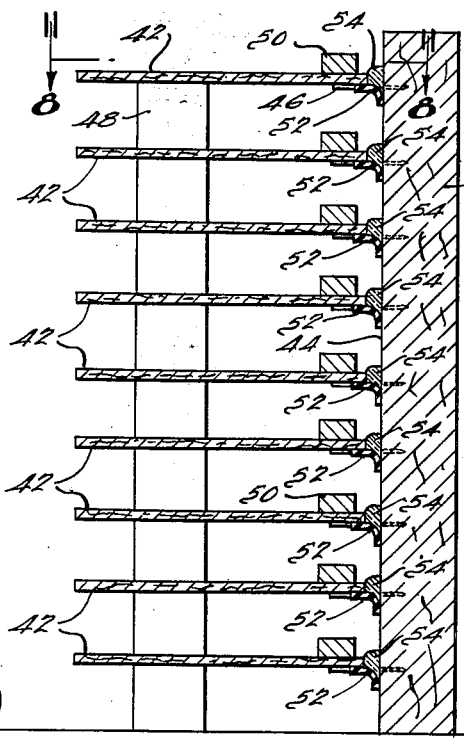
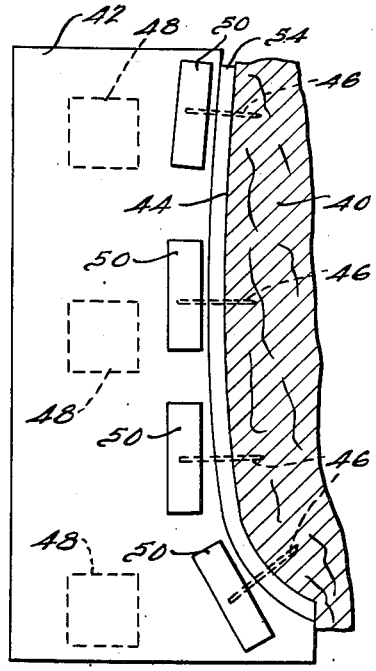
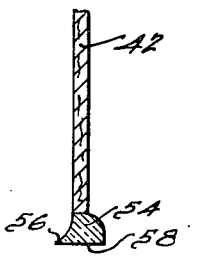
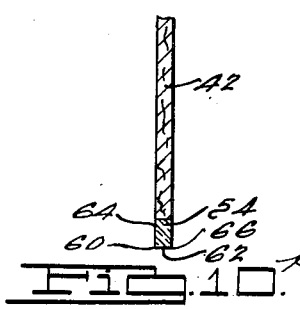
INVENTOR.
Steven P. Kish.
BY
Harness, Dickey & Pierce
ATTORNEYS.

Patented Dec. 16, 1952

2,621,367

UNITED STATES PATENT OFFICE 2,621,367

METHOD OF MAKING TEMPLATES

Steven P. Kish, Lansing, Mich., assignor to Kish Plastic Products, Inc., Lansing, Mich., a corporation of Michigan Original application January 24, 1950, Serial No. 140,333. Divided and this application August 19, 1952, Serial No. 305,275

1 Claim. (Cl. 18—47.5)

This invention relates broadly to industrial models. More particularly, the invention relates to an improved method of making templates for industrial models and to the templates produced as a final product.

This application is a division of my application Serial No. 140,333, filed January 24, 1950.

An important object of the present invention is to provide a faster and more accurate method of making templates for industrial models.

Another object of the invention is to provide a method of making templates for industrial models that permits the templates to be made directly from clay styling dummies, if desired.

Still another object of the invention is to provide a method of making templates for industrial models that permits the templates to be made more economically than heretofore.

Yet another object of the invention is to provide an improved template that is sufficiently strong and rugged to withstand handling and abuse to which devices of this character normally are subjected.

A further object of the invention is to provide a template that is dimensionally relatively stable when subjected to normal variations in temperature.

A still further object of the invention is to provide a template that will not warp or buckle when exposed to dampness or other unfavorable physical conditions for long periods of time and that is not affected appreciably by other materials with which it is likely to come in contact in use.

Other objects and advantages of the invention will be apparent during the course of the following description.

In the drawings forming a part of this specification and wherein like numerals are employed to designate like parts throughout the same:

Fig. 1 is a top plan view showing a female mold set up for making templates according to the present invention;

Fig. 2 is a transverse sectional view taken on the line 2—2 of Fig. 1 and illustrating a preliminary operation in the manufacture of a template from the mold;

Fig. 3 is a view similar to Fig. 2 but illustrating a subsequent step in the manufacture of the template;

Fig. 4 is a fragmentary, enlarged, vertical sectional view taken on the line 4—4 of Fig. 3 and showing the template on the mold;

Fig. 5 is a view similar to Fig. 4 but showing the template removed from the mold and trimmed to its final shape;

Fig. 6 is a perspective view of the finished template;

Fig. 7 is a vertical sectional view showing a male model set up for making templates according to a modified procedure embodying the invention;

Fig. 8 is a transverse sectional view taken on the line 8—8 of Fig. 7;

Fig. 9 is a transverse sectional view through the template as it appears when removed from the model;

Fig. 10 is a view similar to Fig. 9 but illustrating the template after it has been trimmed to final shape;

Fig. 11 is a perspective view of the finished template; and

Fig. 12 is a fragmentary, perspective view illustrating a procedure for making templates embodying the instant invention from a conventional body draft.

The instant invention is a convenient aid in the manufacture and fabrication of models, fixtures, and tools of the type employed by the automobile and other industries for making sheet-metal stamping and forming dies and for testing or checking parts produced by the dies. However, the invention is not limited to this use. Other applications will be readily apparent to those skilled in the art, and it is intended that the invention be used in any capacity where it has utility.

In the automobile industry the first step in developing a new body style is to prepare artist sketches which illustrate the new construction. A clay styling dummy is then made which depicts the new design in full-scale, three-dimensional form. Various models, tools, and fixtures are then made either directly or indirectly from the styling dummy. In the manufacture of these items, it is necessary to prepare templates by means of which the shape or form of the implements can be tested. As suggested, the present invention is concerned primarily with the manufacture of the templates.

Heretofore, it has been an almost universal practice to make a mahogany duplication of the clay styling dummy. This has been considered necessary because the dummy, by reason of its very nature, cannot stand shipment or appreciable handling and its surface is easily marred or deformed by improper use. These mahogany duplications are made by skilled craftsmen and require many weeks or even months of tedious hand labor.

I have discovered that the manufacture of mahogany models heretofore deemed necessary, as well as other expensive and time-consuming operations, can be dispensed with by adopting certain radical departures from conventional procedures. One of the steps involved in the improved procedure is a quick and inexpensive way of making templates and which will permit the templates to be made either directly from the clay styling dummy or from a suitable mold made therefrom or a reproduction thereof. Important advantages, both in time and in cost, are achieved by being able to make the templates directly from the clay dummy. It is a feature of this invention that the templates can be made directly from the clay dummy, if desired, without appreciably defacing or marring the same. At the same time, the finished template is adequately strong for industrial use and it has dimensional stability necessary in a device of this character.

In Figs. 1-6 I illustrate one procedure embodying the present invention, and attention is first directed thereto. By way of example, I show a template being made from a female mold 20. It will be readily appreciated, however, that the mold 20 is here shown only by way of illustration and that the procedure here described can be applied to either male or female parts.

The particular mold 20 here shown reproduces in negative form the hood of an automobile. In actual practice a mold of the type shown might have been made directly from the clay styling dummy or from a duplication thereof made according to conventional practice or in the manner shown in either of my copending applications Serial No. 112,676, filed August 27, 1949, and Serial No. 118,113, filed September 27, 1949. The mold 20 is not a part of the present invention and it can be made either of relatively impermanent material such as plaster of Paris or the like or it can be a more durable and relatively permanent fixture made according to the teachings of my prior applications referred to above.

In any event, it is presumed that the model or mold 20 has the usual scribe lines 22 on the working face 24 thereof which indicate where templates are to be made. Usually the scribe lines 22 are spaced approximately five inches apart; however, they may be spaced closer or farther, depending upon the exigencies of the particular situation. Usually the scribe lines 22 extend both horizontally and longitudinally. These scribe lines usually are scored into the clay styling dummy and are therefore reproduced on the female mold. Alternatively, the scribe lines may be first formed in any suitable manner directly on the mold. Only one scribe line 22 is here shown. In actual practice, a separate template is formed for each scribe line and identical procedures are followed in the production of each template. Each template may be formed as a separate operation, or, if desired, all of the templates which are similarly situated on the model or mold may be formed at the same time.

The first step in making a template for the scribe line 22 is to prepare the working surface of the mold so that it is relatively nonadhesive to other materials. In some instances the natural surface may be suitably nonadhesive, and in other instances it may be necessary to coat the surface with a suitable parting compound. A backing strip 26 is then made, which strip has a lower edge 28 which conforms generally to the shape or contour of the mold at the scribe line. I have found that the pressed boardlike materials such as Masonite are satisfactory, but it will be readily appreciated that the strip 26 can be made from a variety of materials.

In the manufacture of the template it is necessary to position the backing strip 26 above the mold 20 with one side thereof exactly parallel to and coincident with the scribe line 22. To this end I provide a guide in the form of two parallel rows of nails or brads 30 which are embedded in the mold 20. One row of brads 30 is to one side and flush with the scribe line 22 and the other row of brads is on the opposite side of the scribe line and parallel to the first row of brads. The two rows of brads 30 are spaced to snugly fit the backing strip 26. When the lower marginal portion of backing strip 26 is fitted between the parallel rows of brads 30, the latter serve as a guide or way for holding the backing strip properly positioned with respect to the scribe line 22. In order to hold the backing strip 26 spaced slightly from the surface 24, I embed brads 32 at spaced points along the undersurface 28. Thus when the backing strip is applied to the model in the manner hereinabove described, brads 30 seat on the surface 24, as shown in Fig. 3, to holding the backing strip properly spaced from the surface 24.

In connection with the foregoing it will be readily appreciated that any suitable guide means may be provided for positioning the backing strip 26 properly with respect to the scribe line 22. If it is necessary, as in the case of a clay styling dummy, that the surface not be marred or otherwise defaced, a suitable overhead structure may be constructed for holding the backing plate properly with respect to the surface of the model.

To make the template, a strip or ribbon 34 of hardenable plastic material is placed on the surface 24 so that it extends along and on top of the scribe line 22. Then while the material 34 is still in a plastic condition, the backing strip 26 is fitted between the brads 30, and the lower marginal portion thereof is embedded in the plastic material (Fig. 4). As a result of this operation, the material 34 is pressed against the surface 24 so that it accurately reproduces every detail of such surface. In addition, the plastic material 34 closes over the lower marginal portion of the backing strip 26 and is securely bonded thereto. Plastic material 34 is then hardened or set so that it in effect becomes an integral part of the backing strip 26. The brads 30 preferably are removed before the strip 34 completely hardens; however, the brads 32 are left intact and assist the natural bond between the backing strip 26 and the plastic material 34 in holding the plastic facing on the backing strip.

Any suitable plastic material may be used for the facing 34. I have found that thermosetting organic plastic materials such as urea formaldehyde and phenol formaldehyde resins are preeminently satisfactory. This resin is relatively light in weight, is adequately strong, is dimensionally stable under normal variations in temperature, and is resistant to foreign materials with which it is likely to come in contact in use. Also, this resin is easy to handle, sets quickly, and makes a strong permanent bond with the backing strip 26. When material such as Masonite or the like is used for the backing strip 26 the plastic material 34 apparently actually penetrates the backing strip sufficiently to form a strong, essentially one-piece construction. Another advantage of this resin is that it will conform accurately to the surface 24, and it is essentially devoid of air pockets or other surface blemishes, so that it accurately reproduces every detail of the surface 24 including the scribe line 22.

After the plastic facing 34 has set or hardened, the unfinished template is removed from the mold 30 and trimmed, as shown in Fig. 5, flush with the scribe line reproduced on the undersurface of the facing. The trimmed surface 36 preferably extends exactly at right angles to the undersurface of the facing 34 and flush with the side 38 of backing strip 26. As a result of this procedure the edge 39 of the facing 34 conforms exactly to the surface of the mold 20 along the scribe line 22.

In Figs. 7-11 I illustrate a modified procedure using a male model 40. As in the form of the invention first described, the model 40 is not a part of the invention. It may comprise the clay styling dummy or a reproduction thereof. The reproduction may be either conventional or made according to the procedure shown in my copending application Serial No. 66,886, filed December 23, 1948. The particular form 40 here shown by way of illustration represents the fender of an automobile.

In order to further explain certain principles set forth in connection with the form of the invention first described, I here show a plurality of templates being made at one time. It is assumed in this connection that the model 40 is equipped with the usual scribe lines and that a separate template is to be made for each scribe line.

According to the present invention, a backing strip 42 is provided for each scribe line and the undersurface of each strip is shaped to conform generally to the contour of the model at its respective line. Nine backing strips 42 are here shown, but it is obvious that this number will vary in any particular instance depending on the size and shape of the model.

Some means must be provided for holding the backing strips 42 so that one side of each strip is positioned flush with its respective scribe line as in the form of the invention first described. In the particular setup here shown by way of illustration, the model 40 is a male duplication and is placed on end so that the backing strips 42 extend horizontally from the working surface 44 thereof. The particular means here shown for holding the backing strips properly positioned on the model 40 comprise rows of brads 46 below and flush with the scribe lines (not shown) and spacers 48. The model 40 is placed on a suitable supporting surface 49, the proximate marginal edges of the backing strips 42 are supported on the brads 46, and the outer portions of the strips are supported in properly spaced relation by the spacers 48, as perhaps best shown in Fig. 7. Alternatively, any suitable form or jig (not shown) may be used for holding the parts so positioned. Also, each backing strip preferably is provided with a small weight 50 which holds the inner end thereof pressed against and properly located on the brads 46.

The spaces thus defined between backing strips 42, the surface 44 of the model 40 are closed off by sealing strips 52 which extend entirely across the model and for the full width of the backing strips 42. Any suitable flexible sheet material may be used for the sealing strips 52. Relatively stiff but pliable sheet rubber or ordinary sheet wax has been used satisfactorily in this capacity. It will be observed in this connection that the sealing strips 52 extend along the undersides of backing strips 42 and that the strips are curved downwardly to engage the surface 44 of model 40. Thus, the closure strips 52 define troughs or channels; and by reason of the curved shape of the strips, the scribe lines are contained within the channels.

Hardenable plastic material 54 is then poured into the channels and, as in the form of the invention first described, the plastic material preferably comprises a phenol or urea resin. The plastic material 54 completely fills the channels, and each strip or ribbon of the material preferably is mounted above its respective backing plate 42, as shown in Fig. 7. By reason of the curved shape of strips 52, each ribbon of plastic material 54 extends downwardly across its respective scribe line so as to overlie and accurately reproduce the line in the undersurface of the material. When the plastic ribbons 54 harden or set, they bond solidly to their respective backing strips 42 and form plastic facings on the edges of the backing strips which conform exactly to the model surface 44. After the plastic strips 54 have set sufficiently and bonded to their respective backing strips, the brads 46 are removed and the templates thus formed are separated from the model 40.

As an alternative procedure, both sides of the templates 42 can be sealed off by rubber strips 52 or the like, and plastic material 54 forced under pressure into the space confined by the backing and sealing strips as disclosed in Fig. 12 of my copending application Serial No. 118,113, filed September 27, 1949. When introduced in this manner the plastic material 54 entirely fills the confined spaces and bonds securely to the underedges of the backing strips 42 to provide a plastic facing on the strips which conforms exactly to the surface of the model 40.

The individual templates have substantially the cross-sectional form shown in Fig. 9. In order to render the templates in condition for use, however, it is first necessary to trim the portion designated by the numeral 56 along the scribe line reproduced in the undersurface 58 of the facing 54. After the plastic facing 54 has been trimmed in the manner described, the edge 60 conforms exactly to the surface of the model 40 at the scribe line. It may or may not be necessary also to trim the opposite sides of the plastic facing 54. However, this may be done if desired, and in Fig. 10, I have shown the facing trimmed in this manner. Also, in case there is longitudinal slope or inclination to the model 20 and it is desirable to render the template suitable for either right- or left-hand use, it may be necessary to trim the undersurface 62 of the plastic facing 54 so that the included angle between the trimmed side 64 of the facing and the undersurface 58 for the entire length of the scribe line is not greater than ninety degrees. Preferably the undersurface 58 should be exactly ninety degrees with respect to the trimmed side 64 of the facing. When this is done the opposite edge 66 conforms exactly to the edge 60 so that either edge may be used as a reference. A finished template of the type described is shown in Fig. 11.

Attention is now directed to Fig. 12, which shows a convenient and ingenious method of making plastic-faced templates of the type embodying the instant invention easily and quickly from conventional body drafts. Body drafts usually are made at about the same time as the styling model, and these drafts show outlines, high-light lines, and joint lines of the various major skin panels. When making master models of the parts it is necessary to conform the joint lines with the body drafts. Body drafts usually are made from sheet aluminum to insure dimensional stability, and lines representing the various outline shapes, joint lines, and high-light lines are scored directly in the surface of the aluminum. The master models can best be conformed to the body drafts by means of templates. As suggested, it is the purpose here to describe a convenient method of making the templates easily and quickly from the body drafts.

In Fig. 12 a fragmentary portion of an aluminum body draft is shown at 68. The body draft here shown comprises sheet aluminum 70 having a joint or other line 72 to be reproduced scored in the top surface thereof. According to the present invention a sheet 74 of transparent material such as ordinary vinyl plastic is placed on the body draft 68 and a line 76 is scored in the top surface of the plastic sheet directly above and conforming exactly to the draft line 72. The line 72 is readily visible through the plastic material 74 and the line 76 can be readily made in an obvious manner using conventional drafting curves and instruments. After the line 76 has been scored in the plastic material 74, a backing strip 78 is fashioned so that one edge 80 thereof conforms generally to the lines 72 and 76 and the backing strip is placed on the transparent sheet 74 with the edge 80 spaced slightly to one side of line 76. A temporary retaining strip 82 of wax, rubber or the like is then placed on the transparent sheet 74 at the other side of and spaced laterally from line 76. The filler strip 82 should be approximately the same height or thickness as the backing strip 78, and the strip should conform generally to line 76. Thus, the backing strip 78 and the retaining strip 82 define a relatively narrow channel containing line 76. This channel is then filled with plastic material 84 which conveniently may be a urea formaldehyde or phenol formaldehyde resin of the type referred to in connection with the foregoing forms of the invention. Preferably the inner wall or side of retaining strip 82 is coated with a suitable parting compound so that the retaining strip can be easily broken away from the plastic material 84. The inner edge of retaining strip 78, on the other hand, is uncoated so that a good bond is established between the plastic material and the backing strip. Thus, after the plastic material is hardened or set, the retaining strip 82 can be easily stripped away from the plastic sheet 74 and from the poured plastic facing 84 and the backing strip 78 with the plastic strip 84 bonded securely thereto can be readily removed from the sheet 74. The scored line 76 is reproduced in the form of a raised ridge 86 in the undersurface of plastic facing 84, as clearly shown in the drawings. The plastic facing 84 is then trimmed along the ridge line 86, and the trimmed edge of the facing then conforms exactly with the line on the body draft. The finished template has substantially the same appearance as the template shown in Fig. 11.

In view of the foregoing it will be readily apparent that the template produced by the instant invention can be used in various ways in the manufacture of industrial tools, models, and fixtures. In every instance the template comprises a backing strip having a facing of hardened plastic material along one edge thereof. The facing is securely bonded to the backing strip and the outer surface of the facing conforms exactly to a surface of predetermined form to be reproduced thereby.

The procedure herein described offers a convenient way of making templates suitable for industrial uses. The templates can be formed easily and quickly and they are sufficiently strong to withstand handling and abuse to which they normally are subjected in use. I have found that the plastic facings bond solidly to their respective backing strips and that the finished templates have adequate dimensional stability.

Having thus described the invention, I claim:

The method of making a template which accurately reproduces a line on a conventional body draft comprising covering the line to be reproduced with a sheet of transparent material and reproducing the line by scoring the top surface of the sheet material, and then placing separate backing and retaining strips on the transparent sheet material at opposite sides of said scored line, filling the intervening space between the backing and retaining strips with hardenable plastic material so that said hardenable plastic material bonds to the backing strip and accurately reproduces the scored line in the form of a ridge line on the undersurface thereof, and then after said plastic material has hardened trimming such plastic material along said ridge line.

STEVEN P. KISH.

No references cited.